United States Patent

[11] 3,598,995

[72] Inventors Masao Inoue
 Kawasaki-shi;
 Zenzo Tamura, Tokyo, both of, Japan
[21] Appl. No. 755,984
[22] Filed Aug. 28, 1968
[45] Patented Aug. 10, 1971
[73] Assignee Tokyo Shibaura Electric Co., Ltd.
 Kawasaki-shi, Japan
[32] Priority Oct. 9, 1967
[33] Japan
[31] 42/64720

[54] METHOD OF EVALUATING ULTRAVIOLET RADIATIONS AND QUALITATIVE ANALYSIS INVOLVING SUCH EVALUATIONS
4 Claims, 7 Drawing Figs.
[52] U.S. Cl................................................. 250/71 R,
 210/31, 210/198, 250/83.3 UV, 356/51
[51] Int. Cl................................................G01n 21/22
[50] Field of Search........................................... 250/71,
 83.3 UV, 80; 356/51; 252/301.2; 210/198 C, 31 C

[56] References Cited
UNITED STATES PATENTS

| | | | |
|---|---|---|---|
| 2,346,661 | 4/1944 | Cannon, Jr. et al........... | 250/71 |
| 3,302,023 | 1/1967 | Schachter..................... | 250/71 |
| 3,105,908 | 10/1963 | Burkhardt et al............. | 250/71 |
| 3,291,749 | 12/1966 | Steerup........................ | 250/71 |
| 3,320,417 | 5/1967 | Alburger...................... | 250/71 |
| 3,412,245 | 11/1968 | Halverson.................... | 250/71 |

Primary Examiner—James W. Lawrence
Assistant Examiner—Morton J. Frome
Attorney—Kemon, Palmer & Estabrook ABSTRACT: Evaluation of wavelengths of ultraviolet radiations is made by irradiating a mixture of two or more specific fluorescent substances, that exhibit different excitation and emission spectra from each other, with ultraviolet rays of unknown wavelengths, identifying distinctive visible colors exhibited by the irradiated mixture and comparing these colors with standard colors which the mixture exhibits when irradiated by ultraviolet rays of known wavelength. Such evaluations are used for the qualitative analysis of sampled materials.

METHOD OF EVALUATING ULTRAVIOLET RADIATIONS AND QUALITATIVE ANALYSIS INVOLVING SUCH EVALUATIONS

BACKGROUND OF THE INVENTION

This invention relates to a method for evaluating ultraviolet radiations and more particularly to a method for qualitatively evaluating ultraviolet radiations using fluorescent substances.

The usual practiced methods for detecting ultraviolet radiations include the following:

1. A method which consists in allowing monochromatic ultraviolet radiations separated by a prism or grating-type spectroscope to be received in a suitable photoelectric detector such as a photoelectric multiplier or photoelectric tube to find the spectroenergy distribution of the ultraviolet radiations applied.
2. A method selectively using different types of illuminometers for germicidal radiations, erythemal radiations for health and near-ultraviolet radiations each provided with a photoelectric tube, wherein the peaks of spectral sensitivity appear at the wavelengths of 250 m.$\mu$, 290 m.$\mu$ and 360 m.$\mu$ respectively.
3. A method using various combinations of filters and photoelectric detectors among those listed above.

The method (1) is widely used, because it is most adapted for quantitative determination. However, an apparatus associated with this method is considerably expensive, involves complicated operations and requires much time in completing determination, so that the method is unsuitable for quick, handy qualitative detection. An apparatus used for the method (2) makes the same response to ultraviolet radiations though they have a fairly broad range of wavelengths, so that when a monochromatic ultraviolet radiation is irradiated it is difficult to define the particular wavelength thereof. The method (3) requires an apparatus which is most costly next to that of the method (1), involves complicated operations and consumes as long time in determination as in (1).

SUMMARY OF THE INVENTION

An object of the present invention is to provide an improved method which does not require an expensive apparatus but permits an easy and quick qualitative determination of ultraviolet radiations of unknown wavelengths.

Another object of the invention is to irradiate ultraviolet radiations having continuous wavelengths on a sample of unknown material, determine the absorption or emission of radiations from the sample exhibited visible colors and use the results of such determination as an aid in finding the kind of material constituting said sample.

These objects are in part accomplished in accordance with the present invention by irradiating a mixture of two or more specific fluorescent substances, each of which exhibits different excitation and emission spectra from the other, with ultraviolet rays of unknown wavelengths, identifying distinctive visible colors exhibited by the irradiated mixture and comparing these colors with standard colors which the mixture of fluorescent substances exhibits when irradiated by ultraviolet rays of known wavelength.

These objects are in part further accomplished by the invention through the qualitative analysis of unknown materials by irradiating an unknown sample material with ultraviolet radiations of continuous wavelengths, in turn irradiating one of the specific fluorescent mixtures as aforesaid with the ultraviolet radiations emitted, either by reflection or transmission, from the irradiated sample and evaluating the visible colors produced on the fluorescent mixture by the radiations emitted from the sample.

The features of the invention which are believed to be novel are set forth with particularity in the appended claims. The invention itself, however, as to its organization together with further objects and advantage thereof, may best be understood by reference to the following description taken in connection with the accompanying drawings.

DETAILED DESCRIPTION OF THE INVENTION

Figure 1:
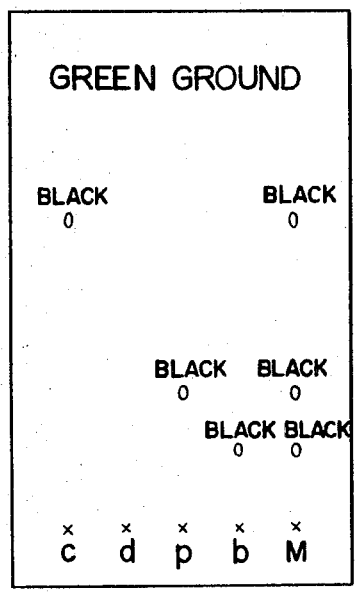
FIG. 1 illustrates an example of a thin-layer chromatographic analysis using an adsorbent mixed with a single fluorescent substance.

It is for the following reason that the present invention uses a mixture of fluorescent substances which present different excitation and emission spectra.

If a single fluorescent substance is irradiated with ultraviolet (hereinafter referred to as "UV") radiations the colors of luminescent spots produced do not always correspond to the different wavelengths of the UV radiations applied. However, even in the use of mixed two or more fluorescent substances, for example, a combination of calcium halophosphate activated by antimony and calcium halophosphate activated by antimony and manganese which have substantially the same excitation spectrum, but different emission spectrum, or a combination of magnesium fluorogermanate activated by manganese and magnesium arsenate activated by manganese which have different excitation spectrum from each other, but substantially the same emission spectrum or a combination of magnesium arsenate activated by manganese and magnesium boroarsenate activated by manganese which have substantially the same excitation and emission spectrum, the colors of luminescent sports obtained do not necessarily accord with the different wavelengths of the UV radiations applied as in the case where only one fluorescent substance is irradiated.

We have found that it is only when a mixture of two or more fluorescent substances which display different patterns in both excitation and emission spectra is subjected to UV radiations that the colors of luminescent spots produced distinctly agree with the different wavelengths of said radiations.

According to the present invention, mixed powders of two or more fluorescent substances as specified above are pulverized to the extent that their average grain size is reduced to 3 to 10 microns as measured by the Blaine method, using a mixer, for example, a ball mill. After formed into any thin layer, the mixed fluorescent substances are placed in the irradiating zone of a UV radiation detecting apparatus to observe the colors of the luminescent spots produced by the irradiation. Since the colors of the luminescent spots exhibited by each combination of the above-mentioned fluorescent substances when exposed to UV radiation of a known wavelength have already been defined, it is possible to discriminate the colors of luminescent spots exhibited by the mixed fluorescent substances when irradiated with UV radiations of unknown wavelengths, thus permitting an easy qualitative determination of the wavelength which constitutes the main component of the UV radiation applied.

While the method of the present invention enables a number of wavelengths involved in polychromatic UV radiations to be determined at the same time, it is particularly adapted to distinguish the wavelength of a monochromatic UV radiation qualitatively and distinctly.

The aforementioned mixture of fluorescent substances may be replaced by a laminate formed by securely superposing a thin layer of each fluorescent material on a glass plate. However, it is desired that the fluorescent substances be so combined as not only to meet the specified conditions as described above, but also to assure that the spectrum exhibits a sharp pattern of distribution and distinct alienation.

Where the fundamental method of the present invention is utilized in various physicochemical analytical processes, the qualitative determination may be carried out with continuous UV radiations. When the mixture of fluorescent substances of the present invention is directly irradiated with continuous UV radiation, the mixture exhibited visible color obtained presents a white shade due to intermingling of many different wavelengths. However when the continuous UV radiation is allowed to permeate through a sample of analysis or to be irradiated thereon particular wavelength or lengths of the UV radiation are absorbed by the sample. And when the remaining UV rays or a composite UV radiation formed by addition of the UV rays of particular wavelength emitted by the sample is irradiated on the mixed fluorescent substances of the present invention, then specific visible colors appear thereon according to absorption or emission. Observation of such colors permits an easy qualitative determination of the unknown material of the sample.

EXAMPLES

The invention is more clearly set forth in the following examples and applied embodiments, given by way of illustration and not in limitation.

Table 1 presents several combinations of mixed fluorescent substances, the blending ratio of each such substance, and the kinds of monochromatic colors corresponding to the different wavelengths of the UV radiations applied. The fluorescent substances in this table were respectively prepared by the following procedures:

$Sr_{1.97}P_2O_7/Sn_{0.032}$ ——: 30.0 kg. of strontium pyrophosphate $Sr_2P_2O$ and 0.54 kg. of tin hydrogenphosphate $SnHPO_4$ were mixed and milled 1.5 hours in a 150 $l$ ball mill. The mixture was put in a quartz tray 25 cm.×18 cm.×9 cm. in size, heated at 1,000° C. for 1 hour in the air and then for another hour at the same temperature in an atmosphere of a forming gas consisting of 5 percent H and 95 percent $N_2$ which was introduced at a flow rate of 1,000 $l$ per hour. After cooling, the mixture was again pulverized in the ball mill to obtain a fluorescent substance. The composition of the product computed from the proportions of the raw materials accorded with the aforementioned chemical formula.

$Zn_{1.75}SiO_4/Mn_{0.1}$ ——: 3.37 kg. of silica $SiO_2$, 8.00 kg. of zinc oxide ZnO and 0.63 kg. of manganese carbonate $MnCO_3$ were mixed and milled for 1 hour in a 50 $l$ ball mill. The mixture was put in a quartz tray 25 cm.×18 cm.×9 cm. in size, and heated 3 hours at 1,200° C. in the air with the tray closed. After cooling, the mixture was again pulverized in the ball mill to obtain a fluorescent substance. Its composition was exactly as shown by the above-mentioned chemical formula.

$Y_{0.88}VO_4/Eu_{0.045}$ ——: 27 kg. of yttrium oxide $Y_2O_3$. 25 kg. of vanadium oxide $V_2O_5$, 2.2 kg. of europium oxide $Eu_2O_3$ and 1 kg. of sodium carbonate $Na_2CO_3$ were mixed and milled 3 hours in a 400 $l$ ball mill. The mixture was put in a 280 cc. quartz crucible and heated 2 hours at 1,200° C. in the air. After cooling, the mixture was again pulverized in a ball mill, followed by water washing, filtration and drying, to obtain a fluorescent substance. Its composition agreed with the aforementioned chemical formula.

$ZnS/Ag_{0.00014}$ ——: 100 kg. of zinc sulfide ZnS, 0.0236 kg. of silver nitrate $AgNO_3$, 2 kg. of sodium chloride NaCl and 1.5 kg. of magnesium chloride $MgCl_2\cdot 5H_2O$ were mixed in a 400 $l$ vessel with addition of 200 $l$ of water. After drying at 150° C., the mixture was put in a 280 cc. quartz pot fitted with a cap. After heating for 1 hour at 900° C. and cooling, the mass was washed with water to remove the flux, and dried again to obtain a fluorescent substance. Its chemical composition was substantially as indicated by the aforementioned chemical formula.

$Zn_{0.6}Cd_{0.4}S/Ag_{0.0001}$ ——: 50 kg. of zinc sulfide ZnS, 50 kg. of cadmium sulfide CdS, 0.0157 kg. of silver nitrate $AgNO_3$, 2 kg. of lithium chloride LiCl and 1 kg. of sodium chloride NaCl were mixed in a 400 $l$ vessel with addition of 200 $l$ of water. After drying at 150° C., the mixture was put in a 280 cc. alumina pot fitted with a cap, and heated for 1 hour at 900° C. in the air. After cooling, the mass was washed with water to remove the flux and then dried to obtain a fluorescent substance. Its composition was the same as the above-mentioned chemical formula.

When UV radiations having wavelengths varying from 200 to 380 m$\mu$ were irradiated on each of the groups A, B, C and D of thin layers of mixed fluorescent substances fixed on a glass plate, there were presented monochromatic colors corresponding to the respective wavelengths as shown in table 1. When UV radiations of unknown wavelengths were applied to an appropriate one among the aforesaid groups, their wavelengths were qualitatively determined conversely from the colors exhibited in the chromatic spectra thereof.

TABLE 1
Corresponding luminescent spectra to an ultraviolet radiation

Weight ratio of mixed fluorescent substances

| A | $Sr_{1.97}P_2O_7/Sn_{0.032}$ 20 | : | $Zn_{1.75}SiO_4/Mn_{0.1}$ 5 | + | $Y_{0.88}VO_4/Eu_{0.045}$ 1 |
|---|---|---|---|---|---|
| B | $Zn_{1.75}SiO_4/Mn_{0.1}$ 5 | : | $Y_{0.88}VO_4/Eu_{0.045}$ 1 | + | $ZnS/Ag_{0.00014}$ 2 |
| C | $Y_{0.88}VO_4/Eu_{0.045}$ 1 | : | $Zn_{0.6}Cd_{0.4}S/Ag_{0.0001}$ 1 | | |
| D | $Zn_{1.75}SiO_4/Mn_{0.1}$ 9 | : | $Y_{0.88}VO_4/Eu_{0.045}$ 1 | | |

Wave lengths of irradiated UV radiation
200$\mu$ ————————————→ 380m$\mu$

Corresponding chromatic color

A blue→green→yellow→orange→red→pale green

B green→red→violet→blue

C reddish orange→yellow→green

D green→yellow→red→pale green

APPLIED EMBODIMENTS

1. Application to the thin-layer chromatography:

The UV radiation detecting material used in thin-layer chromatography was prepared by mixing an adsorbent, e.g. silica gel or alumina, a mixture of fluorescent substances of the present invention corresponding to 20 weight percent of the adsorbent, and small amounts of adhesive material, and suspending 10 g. of the mixture in 10 m.$l$ of water. The suspension was coated on the surface of a plate of glass or transparent polyvinyl chloride, followed by drying, to form a thin-layer of UV radiation detecting material for chromatography.

At the base point on the thin-layer coated plate was deposited about 5$\mu l$ of a sample solution whose UV spectrum was expected to display a maximum absorption or emission. On this deposit was further poured a suitable solvent. When a continuous UV radiation was allowed to be irradiated on the surface or permeated therethrough various visible colors were observed by the naked eye at different luminescent spots. Though the positions of the spots on the thin-layer coated plate are omitted, table 2 shows the colors of luminescent spots produced according to the kinds of samples tested, where the groups A. C and D of mixed fluorescent substances of table 1 were separately used.

If a standard identification table such as table 2 is prepared in advance with respect to a large number of known materials (there should also be indicated the position of each luminescent spot) the same chromatographic process as described above will enable the unknown materials of tested samples to be identified qualitatively with ease by observing with the naked eye the colors and positions of the luminescent pots produced by irradiating a continuous UV radiation thereon.

The mole absorbancy index determined by this thin-layer chromatography confirmed the presence of about 20,000 different substances using as extremely small amounts of a sample thereof as one microgram. The same procedure as mentioned above is also applicable to the column chromatography. The aforesaid thin-layer coated plate may be replaced by another means which consists in dripping about $5\mu l$ of a sample solution at the base point on a UV-ray permeable glass plate coated with only a thin layer of an adsorbent, followed by development with a suitable developing solvent and superposing this thin layer-coated plate on a detecting plate of ordinary glass or polyvinyl chloride coated with only any of the mixed fluorescent substances of the present invention so as to cause the uncoated plane of both plates to be positioned outside, and thereafter irradiating continuous UV irradiations on the surface of the UV-ray permeable glass. This alternative means can also carry out the thin-layer chromatography as effectively as the preceding process.

TABLE 2

The colors of luminescent spot on the chromatographic column or pater by using various reagents and fluorescent substances

| Samples | Fluorescent substances in Table 1 | | |
|---|---|---|---|
| | A | C | D |
| 2.4-dinitrophenyl alanine | Green | Brown | Green. |
| Methylamine azobenzene | do | do | Do. |
| Acetaldehydo-2.4 dinitrophenyl hydrazone | do | do | Do. |
| Anthraquinone | Violet | Green | Violet. |
| Sulfathiazole | Reddish violet | do | Do. |
| Pydidoxal | Blue | Blue | Blue. |
| Caffeine | Reddish violet | Green | Violet. |
| Sulfanil amide | do | do | Do. |

There will now be described the specific examples where the UV radiation detecting method of the present invention was applied.

Ten parts of the group A of the mixed fluorescent substances in table 1 were mixed with 90 parts of silica gel. 10 cc. of a 1 percent starch solution was added to 10 g. of the mixture to prepare a suspension.

A transparent 10 cm.×20 cm. glass plate was securely held in place at an angle of 60° to the horizontal plane. On this glass plate was poured the aforesaid suspension to form a thin layer, which was then heated to 100° C. to prepare a chromatographic thin-layer coated plate.

The samples used consisted of a mixture comprising 10 mg. of caffeine, 10 mg. of dibucaine, 20 mg. of procaine and 10 mg. of brucine and each of these materials was dissolved in 1 ml of methanol. 1 $\mu l$ of each solution was dripped at a point 4 cm. from the bottom end of a thin-layer coated plate. Each sample-carrying plate was allowed to stand 30 minutes in the gaseous phase of a developer (a mixed solution of 9 cc. of chloroform and 1 cc. of methanol) and thereafter the plate was again dipped to 1 cm. from the bottom end for 30 minutes in the liquid phase of the developer by positioning the plate at an angle of 60° to the horizontal plane. After removal from the bath, the plate was allowed to dry naturally in the dark place.

The respective dripped sample solutions were gathered in one spot at various heights on the thin-layer coated plate due to their different partitions coefficients relative to the adsorbent. While these spots could not be recognized by the naked eye, a continuous UV radiation irradiated on the thin layer of fluorescent substances on the plate was absorbed or emitted to a maximum extent according to the kind of material of each sample, causing a specific color to be presented on the thin layer as a visible spot to the naked eye.

Figure 2:
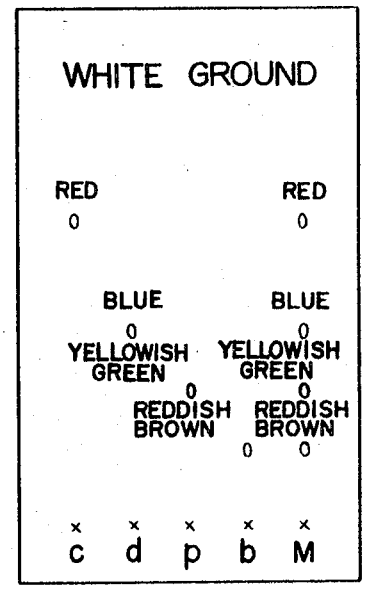
FIG. 2 illustrates an example of a thin-layer chromatographic analysis using an adsorbent comprising a mixture of fluorescent substances in accordance with the invention.

FIGS. 1 and 2 show visible spots produced when a continuous UV radiation was allowed to permeate through a plate coated with a thin layer of the aforementioned single and mixed fluorescent substances respectively. Throughout the figures, the letter $c$ represents caffeine, the letter $d$ dibucaine, the letter $p$ procaine, the letter $b$ brucine and the letter M a mixture of the materials denoted by the letters of $c$, $d$, $p$ and $b$. The marks $x$ indicated near the bottom of the figures designate the points at which each of the sample solutions was dripped.

In FIG. 1 there was used a single fluorescent substance $Sn_{1.75}SiO_4/Mn_{0.1}$. In this case, the entire thin layer presented a pale green color. In this ground there were observed a number of dark ashy spots at the positions shown in the figure, and the spot associated with dibucaine was indistinct and substantially undiscernible. In FIG. 2 there was used a mixture of fluorescent substances, namely, the group A of table 1. In this case there were obtained spots of bright colors at the indicated positions, and the presence of dibucaine was also distinctly observed. Therefore the chromatographic process using the present invention makes it possible easily to identify the unknown material of a given sample tested conversely from the color and position of the luminescent spot produced.

2. Application to the paper chromatography:

The mixed fluorescent substances listed in table 1 were respectively dispersed in acetone. To prepare a fluorescent plate, the dispersion was coated on a transparent glass plate 10 cm.×20 cm., followed by drying.

On the other hand, one composite vitamin tablet containing 5 mg. of vitamin $B_1$, 2.5 mg. of vitamin $B_6$, 70 mg. of vitamin C and 25 mg. of nicotinamide was extracted with 1 ml of methanol. $1\mu l$ of the extract was dripped at a point 6 cm. from the bottom of a chromatographic paper filter 10 cm.×20 cm. in size. The paper was allowed to stand 30 minutes in the gaseous phase of a developing bath, and then dipped 10 hours to 1 cm. from the bottom in the supernatant liquid of a developing bath consisting of 4 parts of $n$-butanol, 1 part of acetic acid and 5 parts of water. After removal from the bath, the paper was allowed to dry naturally in the dark for development.

Figure 3:
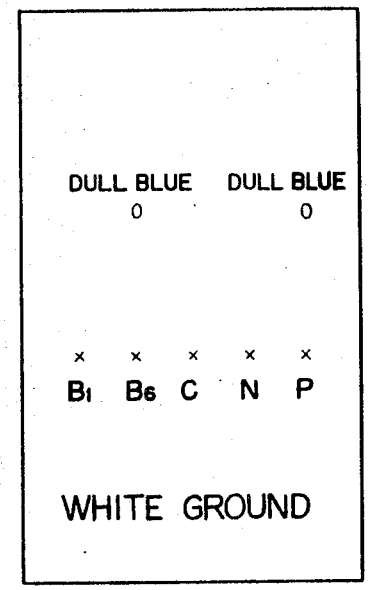
FIG. 3 illustrates a paper chromatographic analysis using no fluorescent substance.
Figure 4:
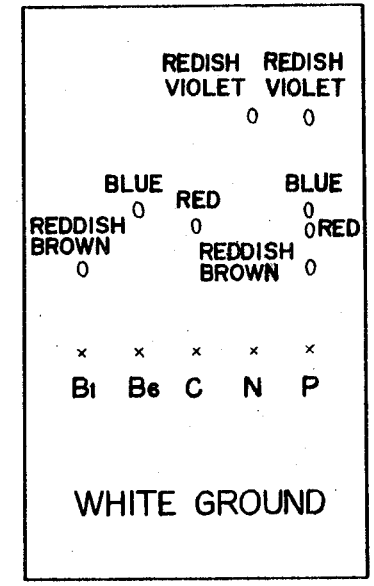
FIG. 4 illustrates a paper chromatographic analysis using a detecting plate coated with a mixture of fluorescent substances in accordance with the present invention.

The developed paper was superposed on the plate coated with the fluorescent substances of the present invention and a continuous UV radiation was allowed to permeate the paper from the side. Then as shown in FIG. 4 there distinctly appeared spots of different colors at various positions on the paper according to the materials of the samples used. By way of comparison, the same continuous UV radiation was allowed to permeate the developed paper without using a plate coated with such fluorescent materials. Then as shown in FIG. 3, only vitamin $B_6$ displayed an indistinct dull blue spot, whereas there appeared no spots to indicate the presence of the other ingredients of the vitamin tablet.

3. Application to a photoelectric detecting camera for improved chromatography:

In the aforementioned chromatographic determination using the present invention, it is sometimes impossible depending on the type of apparatus used or for operating convenience to take out of the apparatus a plate or paper on which a sample solution has been developed. In such case a detecting glass plate coated with any of the mixed fluorescent substances of the present invention can not be superposed on said plate or paper. Thus it is necessary to irradiate continuous UV radiations on the plate or paper from the outside of the apparatus and receive transmitted or reflected UV rays on the detecting glass plate positioned outside of the apparatus so as to identify the sample material.

Figure 5:
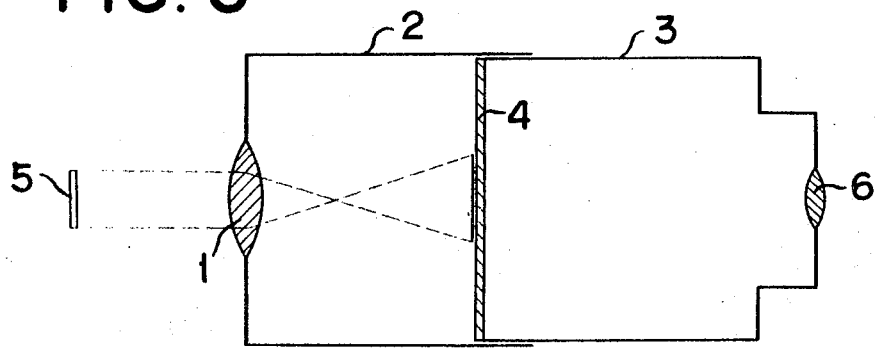
FIG. 5 is a schematic view of a photoelectric detecting camera used for chromatography in accordance with the invention.

To this end, there has been devised by the present invention a photoelectric detecting camera whose structure is schematically shown in FIG. 5. An inner box 3 is allowed to slide into an outer box 2 having a quartz lens 1 provided in the center of the front side thereof which is capable of collecting UV radiations and permitting their passage. On the front side of the inner box 3 is disposed a glass plate 4, whose outside is coated with any of the mixed fluorescent substances of the present invention. When the real image of a subject 5 of determination, namely, a part of the developed chromatographic plate or paper, which has been formed by the UV rays transmitted therethrough or reflected therefrom, is concentrated on the detecting glass plate 4, then there appear on said detecting glass plate colored spots as described above. Light from these spots is further magnified by a magnifying lens 6 positioned at the rear part of the inner box 3 to permit easy observation by the naked eye. If a filter (not shown) for obstructing daylight is provided in front of the quartz lens 1, the naked eye observation will be possible even in the daytime.

4. Application to colorimetric analysis:

Where it was desired to find in the colorimetric analysis a spectrum where UV radiations were absorbed or emitted to a maximum extent by the solution of an analytical sample, it was the usual practice to put the sample solution in a quartz cubette, irradiate UV radiations thereon, receive the radiations transmitted therethrough in a photoelectric spectrometer and investigate the pattern of the spectrum. Therefore the conventional colorimetric method involves troublesome steps. However, if in place of the conventional photoelectric spectrometer a detecting plate coated with a mixture of fluorescent substances of the present invention is used at the position of said spectrometer, the absorption or emission of UV radiations when they are transmitted to the thin layer of the mixed fluorescent substances can be easily recognized by the naked eye from variations in the visible colors of the luminescent spots produced.

Figure 6:
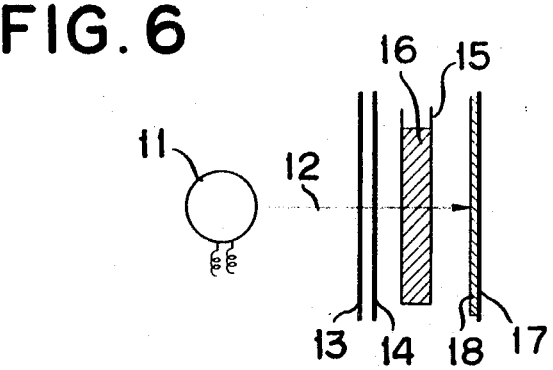
FIG. 6 is a schematic view of an apparatus for colorimetric analysis in accordance with the present invention.

FIG. 6 is a schematic view of a colorimetric analytical apparatus arranged as described above. Thus, radiations 12 from a radiation source 11 such as a hydrogen or xenon discharge lamp permeate a daylight obstructing filter 13 and a suitable number of transmission filter 14 for UV radiations of specific wavelengths. Thus UV radiations of only appropriate wavelengths further penetrate the sample solution 16 contained in a cubette 15 and strike a filmy layer 18 of the mixed fluorescent substances of the present invention securely deposited on a glass plate 17. In this case, the absorption or emission of UV radiations by the sample solution can be easily noticed by the naked eye from the back side of the glass plate 17 according to the visible colors appearing in the thin fluorescent layer on the glass plate 17.

5. Application to routine quality control analysis for production of UV radiation-emitting phosphors:

At present, main UV radiation-emitting phosphors include erythemal phosphor (peak wavelength: for example, 310 m$\mu$), black light phosphor (peak wavelength: for example, 355 m$\mu$) and phosphor for photoduplication (peak wavelength: for example, about 370 m$\mu$). When irradiated with UV radiations of relatively short wavelengths, these phosphors emit UV radiations of relatively long wavelengths as given above. These emitted UV radiations are respectively utilized in particular applications.

A plant manufacturing such phosphors conducts routine analysis for quality control of product. This operation consists in packing a sample phosphor into a small plaque, irradiating thereon a UV radiation whose main wavelength is 2,537 A., receiving the UV radiation emitted thereby in a photoelectric tube and determining the energy thereof. However, this analytical apparatus is of complicated construction, difficult to handle and moreover expensive, so that it can not be deemed adapted for use in routine analysis.

If the mixed fluorescent substances of the present invention are applied to the aforesaid analytical apparatus, it is possible easily to detect the UV radiations emitted by the sample phosphor in the form of corresponding visible colors to the wavelengths. Further, the joint use of various color filters enables the peak shift of the main wavelengths of these emitted UV radiations to be easily observed.

Figure 7:
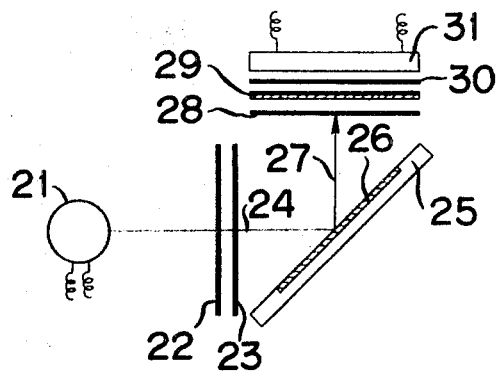
FIG. 7 is a schematic view of an apparatus for routine quality control analysis used in phosphor production in accordance with the present invention.

FIG. 7 is a schematic view of an improved type of the aforesaid analytical apparatus. The UV rays from a sterilization lamp 21 used as a source of light are allowed to pass through a UV radiation filter 22 to obstruct the visible rays thereof and then through an interference filter 23 to take out only a UV radiation 24 having a wavelength of 2,537 A. This UV radiation 24 is caused to irradiate at an angle of 45° a sample phosphor 26 packed in a plaque 25. The reflected UV radiation 27 is allowed to strike a filter 28 for obstructing short-wave rays thereby to cut off the UV radiation having a wavelength of 2,537 A, and permit the passage of only the UV radiation emitted by the sample phosphor. When these emitted UV radiations are caused to strike the mixed fluorescent substances of the present invention coated on a UV-ray permeable glass plate 29 there are presented on the glass plate 29 visible colors corresponding to the wavelengths of the UV radiations finally applied. Observation of these colors permits an easy and instant determination of the wavelengths and spectral distributions of the emitted UV radiations. Also if various color filters 30 are superposed on the glass plate 29 coated with the present mixed fluorescent substances by changing them as often as required and observation is carried out by receiving the visible colors transmitted through the glass plate 29 in a photoelectric multiplier 31, then it is possible to find the peak shift of the UV radiations emitted by the sample material from the ratios of outputs from the respective color filters. Therefore where the method and apparatus for qualitative analysis of the present invention is adopted for the routine quality control analysis in the manufacture of UV ray-emitting phosphors and any peak shift is discovered, then this discloses that there must be some abnormalities with the product. Conversely, if no peak shift takes place, it is a proof that the product is free from any abnormalities.

We claim:

1. In a method for the qualitative analysis of a sample material for its chemical composition, the combination of steps of:
    a. providing a mixture of a plurality of fluorescent substances which exhibit different excitation and emission spectra from each other,
    b. providing a portion of material to be qualitatively analyzed,
    c. irradiating said portion of material with primary ultraviolet radiation to obtain, either by reflection from or transmission through said portion, secondary ultraviolet rays different in wavelength content from said primary ultraviolet radiation,
    d. irradiating said mixture of fluorescent substances with said secondary ultraviolet rays, and
    e. identifying distinctive visible light color exhibited by said mixture when irradiated in step "d".

2. A method as claimed in claim 1 wherein said secondary ultraviolet rays are produced by transmission of said primary ultraviolet radiation through a solution in a solvent of said portion of material and said mixture of fluorescent substances is in the form of a thin layer on a flat substrate.

3. In a method of quality control analysis in the production of ultraviolet ray-emitting phosphors, the combination of steps of:
    a. providing a detecting plate coated with a mixture of a plurality of fluorescent substances which exhibit different excitation and emission spectra from each other,
    b. providing a sample of phosphor to be analyzed,
    c. irradiating said sample with ultraviolet radiation of short wavelength causing the sample to emit ultraviolet radiation of long wavelength,
    d. irradiating said detecting plate with said ultraviolet radiation of long wavelength, and
    e. observing visible light color exhibited by said detecting plate to detect possible abnormal color relative to color normal for phosphor to pass the quality control analysis.

4. A method as claimed in claim 3 wherein the visible light color in step "e" is observed through color filters to aid in detecting any significant shift in the long wavelength ultraviolet radiations emitted by the phosphor undergoing quality control analysis.